United States Patent
Zhang et al.

(10) Patent No.: US 11,991,317 B2
(45) Date of Patent: May 21, 2024

(54) EXTENSION MOBILITY FOR ANALOG TELEPHONES

(71) Applicant: Cisco Technology, Inc., San Jose, CA (US)

(72) Inventors: Haitao Zhang, San Jose, CA (US); Chang-Ho Lin, San Jose, CA (US); Jing Li, Palo Alto, CA (US); Ming Lin Chen, Fremont, CA (US); Nanditha Shenoy, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 80 days.

(21) Appl. No.: 16/806,638

(22) Filed: Mar. 2, 2020

(65) Prior Publication Data

US 2021/0274046 A1    Sep. 2, 2021

(51) Int. Cl.
| | |
|---|---|
| *H04M 1/72* | (2021.01) |
| *H04L 65/1023* | (2022.01) |
| *H04L 65/1069* | (2022.01) |
| *H04L 67/306* | (2022.01) |
| *H04M 1/253* | (2006.01) |
| *H04M 1/274* | (2006.01) |
| *H04M 3/06* | (2006.01) |

(Continued)

(52) U.S. Cl.
CPC ...... *H04M 7/0057* (2013.01); *H04L 65/1026* (2013.01); *H04L 65/1069* (2013.01); *H04L 67/306* (2013.01); *H04M 1/2535* (2013.01); *H04M 7/006* (2013.01)

(58) Field of Classification Search
CPC ..... H04L 67/306; H04L 63/102; H04L 63/08; H04L 12/4641; H04L 67/303; H04M 15/56; H04M 1/2535; H04M 2215/0108; H04M 15/745; H04M 7/125; H04W 8/18; H04W 8/06
USPC ........................................................ 370/401
See application file for complete search history.

(56) References Cited

U.S. PATENT DOCUMENTS

| | | | |
|---|---|---|---|
| 2002/0055351 A1* | 5/2002 | Elsey ................ | H04M 3/42161 455/414.2 |
| 2003/0174814 A1* | 9/2003 | Diacakis ........... | H04M 3/42229 379/80 |

(Continued)

FOREIGN PATENT DOCUMENTS

| | | |
|---|---|---|
| WO | WO2006054980 | 5/2006 |

OTHER PUBLICATIONS

Cisco, Title: "Feature Configuration Guide for Cisco Unified Communications Manager," Release 10.5(2), (c) 2019 Cisco Systems, Inc. First Published: Dec. 19, 2014; Last Modified: Aug. 5, 2019.

(Continued)

*Primary Examiner* — Khaled M Kassim
*Assistant Examiner* — Jason A Harley
(74) *Attorney, Agent, or Firm* — Baker Botts L.L.P.

(57) ABSTRACT

According to some embodiments, a method performed by a software defined wide area network (SD-WAN) controller communicably coupled to a voice gateway comprises determining a user profile from one or more stored user profiles is to be associated with an analog telephone and transmitting the user profile to the voice gateway. In particular embodiments, the SD-WAN controller may receive a request to associate the analog telephone with a user from the voice gateway.

20 Claims, 4 Drawing Sheets

(51) Int. Cl.
*H04M 3/42* (2006.01)
*H04M 3/493* (2006.01)
*H04M 7/00* (2006.01)
*H04W 4/00* (2018.01)
*H04W 4/08* (2009.01)
*H04W 4/24* (2018.01)
*H04W 12/06* (2021.01)
*H04W 60/00* (2009.01)

(56) References Cited

U.S. PATENT DOCUMENTS

| | | | | |
|---|---|---|---|---|
| 2005/0276272 A1* | 12/2005 | Arai | ............ | H04L 61/2015 370/401 |
| 2006/0274892 A1* | 12/2006 | Izumi | ............ | H04N 1/32789 379/201.01 |
| 2013/0163581 A1* | 6/2013 | Majd | ............ | H04M 15/56 370/352 |
| 2014/0086396 A1 | 3/2014 | Ezell et al. | | |
| 2015/0221057 A1* | 8/2015 | Raheja | ............ | G16H 40/20 705/2 |
| 2017/0359334 A1* | 12/2017 | Maddox | ............ | G10L 17/06 |
| 2018/0027394 A1* | 1/2018 | Lau | ............ | H04W 12/08 455/412.2 |
| 2018/0227394 A1* | 8/2018 | King | ............ | H04L 69/324 |
| 2019/0053036 A1* | 2/2019 | Liu | ............ | H04L 61/2503 |
| 2019/0146484 A1* | 5/2019 | Lin | ............ | H04W 4/40 701/2 |
| 2020/0389796 A1* | 12/2020 | Olofsson | ............ | H04W 12/37 |

OTHER PUBLICATIONS

PCT Notification of Transmittal of the International Search Report and the Written Opinion of the International Searching Authority, or the Declaration with attached International Search Report and Written Opinion of the International Searching Authority in International Application No. PCT/US2021/018960, dated May 11, 2021, 14 pages.

* cited by examiner

EXTENSION MOBILITY FOR ANALOG TELEPHONES

TECHNICAL FIELD

This disclosure generally relates to software defined networking in a wide area network (SD-WAN), and more specifically to extension mobility for analog telephones.

BACKGROUND

Traditional wide area network (WAN) architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures are limited in available bandwidth, security, and complexity management, which may hinder a business's productivity.

Software defined networking in a WAN (SD-WAN) simplifies the management and operation of a WAN by decoupling the networking hardware from its control mechanism. Advantages include reducing costs with transport independence across multiple technologies, improving business application performance and increasing agility, optimizing the user experience and efficiency for SaaS and public cloud applications, and simplifying operations with automation and cloud-based management.

A SD-WAN controller provides physical or virtual device management for all SD-WAN devices associated with the controller. This includes, but is not limited to, configuration and activation, IP address management, and pushing down policies onto SD-WAN edges and SD-WAN gateways.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

According to some embodiments, a system comprises an analog telephone, a voice gateway, and a software defined wide area network (SD-WAN) controller. The analog telephone is communicably coupled to the voice gateway and the voice gateway is communicably coupled to the SD-WAN controller.

The SD-WAN controller comprises a memory comprising instructions and one or more user profiles and a hardware processor. The voice gateway comprises: one or more analog telephone interfaces; a memory comprising instructions and one or more user configurations, wherein each user configuration of the one or more user configurations is associated with one of the one or more analog telephone interfaces; and a hardware processor.

The SD-WAN controller, when executing the instructions at the hardware processor, is configured to transmit a user profile to the voice gateway. The voice gateway, when executing the instructions at the hardware processor, is configured to receive the user profile from the SD-WAN controller and, based on the received user profile, update a user configuration associated with an analog telephone.

In particular embodiments, the voice gateway is further configured to receive a request to associate the analog telephone with a user and transmit the request to associate the analog telephone with the user to the SD-WAN controller. The SD-WAN controller is further configured to receive the request to associate the analog telephone with the user from the voice gateway, obtain the user profile for the user in the received request, and the user profile transmitted to the voice gateway comprises the obtained user profile.

According to some embodiments, a method performed by a SD-WAN controller communicably coupled to a voice gateway comprises determining a user profile from one or more stored user profiles is to be associated with an analog telephone and transmitting the user profile to the voice gateway. In particular embodiments, the SD-WAN controller may receive a request to associate the analog telephone with a user from the voice gateway.

Traditional analog phones are still used in many environments. For example, university dorms, hotels, and room sharing services commonly include analog phones in guest rooms. Hotels may provide analog phones as a convenience for guests that do not have mobile phones or that do not wish to use their mobile phones because of low battery, poor signal reception, etc. Hotels and universities may also provide the analog phones for security reasons.

Unlike mobile phones that estimate a location of an incoming call, analog phones allow emergency responders answering a 911 call to determine the exact location, such as the hotel room number, of the caller. This can be done by mapping the analog phone to a known location of an analog (landline) port to which the analog phone connects.

University dorms may also provide analog phones leveraging the existing legacy telephony infrastructure. In many instances it may be cost-prohibitive to update the telephone system for an entire building to add digital (e.g., Internet protocol (IP)) phones.

Although analog phones are still used in many environments, changing the provisioning of analog phones tends to be complex and require significant human effort. Thus, analog phones are usually provided with static provisioning in which the same phone number and features are available regardless of which user is using the phone. Environments in which statically provisioned analog phones are used cannot, therefore, make use of the advantages of simplified user-driven extension mobility provided by IP phones.

Exampl Embodiments

As described above, certain challenges currently exist with analog telephones. Particular embodiments obviate one or more of the problems described above and include extension mobility for analog telephones. Some embodiments include user profiles that can be downloaded from a SD-WAN controller to a voice gateway hosting analog phones.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Digital phones (e.g., IP phones) support an extension mobility feature that allows a user to load his/her profile on any available digital phone in the network. After authenticating the user, the digital phone becomes the user's phone reflecting a user's preferences and settings.

For example, incoming calls placed to the user's regular phone number can be received at the digital phone, and outgoing calls from the digital phone can show the user's name and phone number on a caller ID. This feature may be used, for example, in hot-desking scenarios within an office or guest offices in a workplace so that multiple users can use the same digital phone at different time periods, and the digital phone can be updated with the profile of the applicable user at a given time.

Because of differences in the way that digital phones and analog phones are provisioned, analog phones do not support user profiles or profile mobility, especially in a user-driven context. Rather, changing provisioning on an analog phone currently requires a relatively complex manual registration process with a call agent and associated voice gateway.

An SD-WAN network includes digital endpoints (e.g., client devices) and analog endpoints (e.g., analog telephones) connected to voice gateways. An example SD-WAN network is illustrated in FIG. 1.

Figure 1:
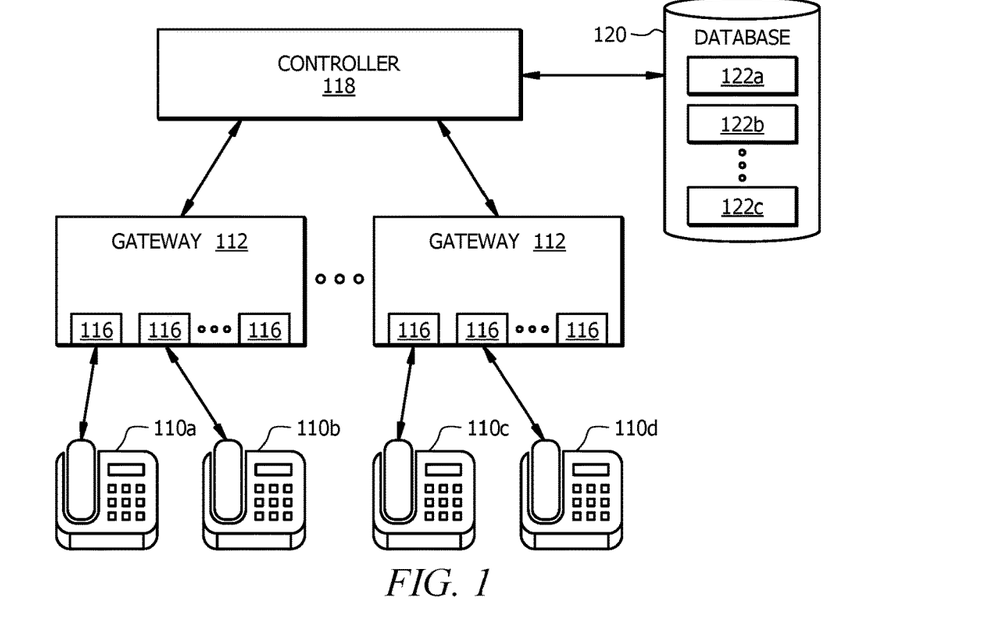
FIG. 1 is block diagram illustrating an example SD-WAN network, according to particular embodiments.

FIG. 1 is block diagram illustrating an example SD-WAN network, according to particular embodiments. SD-WAN network 100 includes one or more analog telephones 110 communicably coupled to one or more voice gateways 112. Analog telephone 110 may be communicably coupled to voice gateway 112 via analog interface 116 (e.g., an RJ11 physical port with a foreign exchange subscriber (FXS) interface, other any other suitable interfaces). Voice gateways 112 are communicably coupled to SD-WAN controller 118 via a network.

Voice gateways 112 interpret, encode/decode, terminate, or re-originate incoming and outgoing voice data to facilitate the endpoints (e.g., analog telephones 110) communicating across and outside network 100. Network 100 includes SD-WAN controller 118 capable of dynamically provisioning and configuring devices. For example, a client device may come onto the network and SD-WAN controller 118 may facilitate the client device accessing the network.

SD-WAN controller 118 can access user profiles. As an example, SD-WAN controller 118 may obtain user profiles 122 from database 120, either locally or via a network. As another example, SD-WAN controller 118 may store user profiles 122 in memory of the SD-WAN controller.

The user profiles may be organized or segregated based on the type of endpoint the user profile may be used with. For example, user profiles applicable to a first type of client device (e.g., mobile devices) may be separated from user profiles applicable to a second type of client device (e.g., laptops).

The user profiles may be created and configured in advance of dynamically provisioning an endpoint with the user profile. For example, a user may create a profile the first time they come onto the network with a device of a particular class. A user may also have a profile created on their behalf, e.g., by an administrator.

A user may modify the user profile. A new employee at a company may be assigned a telephone number and default caller ID name based on their legal name. The user may modify the caller ID name to reflect their preferred name. The user profiles are stored in the user profile database that is accessible to the SD-WAN controller.

The user profile may contain information identifying the user (e.g., the user's name and phone number for caller ID), identifying the device (e.g., the device type of analog or digital phone), or customizing the user of the device (e.g., default volume level, telephone ringtone).

The network may permit user profiles to move between devices based on the realities of the workplace. For example, an office may use "hot-desking" to assign seating locations to employees. The office may contain many identical workstations, each equipped with certain device (e.g., telephone, computer, etc.). When an employee signs on to a device, the device may be configured based on a user's preferences and profile. In this way, a computer may be afforded access to servers and databases accessible to a first user, but not a second user, when the first user is using the computer. Settings on the computer may also be modified accordingly.

Similarly, a user may sign into their telephone and the telephone may be configured based on their user profile. In a related example, an office may have a main location and branch locations. Employees may move between the main and branch locations regularly. A visiting employee may be assigned a guest workspace that is shared among all visiting employees at the branch office. A visiting employee may sign onto devices at the shared workspace. The devices may be configured according to their user profile.

The SD-WAN controller may provision devices automatically or based on an end user request. A SD-WAN controller may be instructed to access an employee schedule that includes information regarding which workstations should be provisioned to which employees. The SD-WAN controller may also be reactive and provision devices at workstations in response to user requests. Thus, an employee using a shared device may enter authenticating information that identifies the user profile and verifies permission to use the profile with the respective device.

To provision or configure the device, the SD-WAN controller may push the user profile (or information from the user profile) to the user device. The device may use the information while configured for the user. For analog telephones, the SD-WAN controller may configure the voice gateway to which the analog telephone is connected.

The user can use the user's personal profile with any available analog telephone in the network. In an embodiment, the analog telephone may have a default phone number (e.g., company phone number, hotel phone number, pre-set phone number where all phones in a company are uniquely numbered) that gets changed to the user's phone number and/or extension by the act of provisioning the analog phone with the user's profile.

This facilitates mobility of the user's phone number as the user moves to different analog phones (e.g., to different branches of an office or to different hotels in different cities). In other words, the user's profile can be moved from a first analog device that connects to the network via a first port to a second analog device that connects to the network via a second port.

In some embodiments, a user may be associated with multiple user profiles, such as one user profile for use with digital phones and another user profile for use with analog phones. In some embodiments, the same user profile can be shared by different types of devices. For example, certain portions of a shared user profile, such as a phone number, may be compatible with both analog devices and digital devices. These portions may be downloaded to either type of device. Other portions of a shared user profile, such as a preferred ring tone, may be compatible with digital devices but might not be supported by analog devices. These portions need not be downloaded to the voice gateway hosting analog phones.

The approach described above is akin to plug-n-play because the user's analog telephone can be mobile. For example, users are able to use any analog phone in a branch building in a personalized manner as it is associated with their user profile.

In particular embodiments, the endpoint devices include analog telephones and the user profiles include user profiles that may be pushed to the analog telephones.

Figure 6:
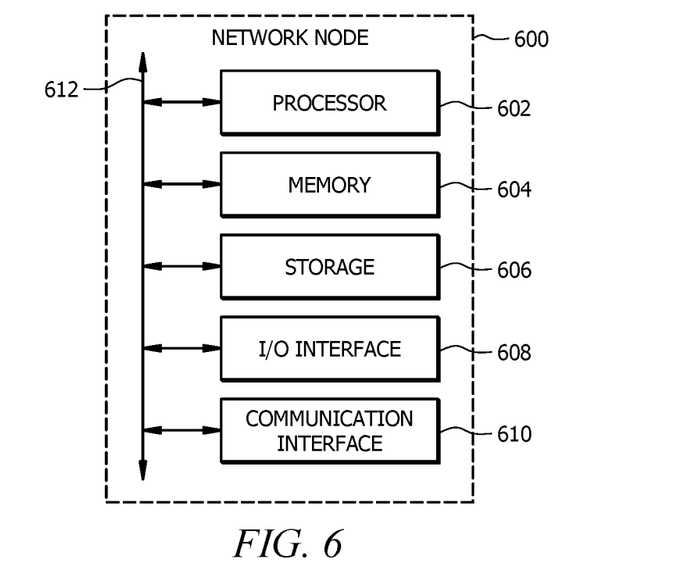
FIG. 6 is a block diagram illustrating an example network node, according to particular embodiments.

In particular embodiments, SD-WAN controller 118 and voice gateway 112 may comprise hardware and software components described in more detail with respect to the network node of FIG. 6.

Referring back to FIG. 1, network 100 may include additional components not illustrated, such as authentication servers, interactive voice recognition servers, etc. The network communicably coupling voice gateway 112 and SD-WAN controller 118 may comprise any type of network that facilitates communication between components of SD-WAN 100. One or more portions of the network may include an ad-hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. The network may include one or more networks. The network may include a core network (e.g., the Internet), an access network of a service provider, an Internet service provider (ISP) network, and the like. One or more portions of the network may use SD-WAN technology.

Figure 2:
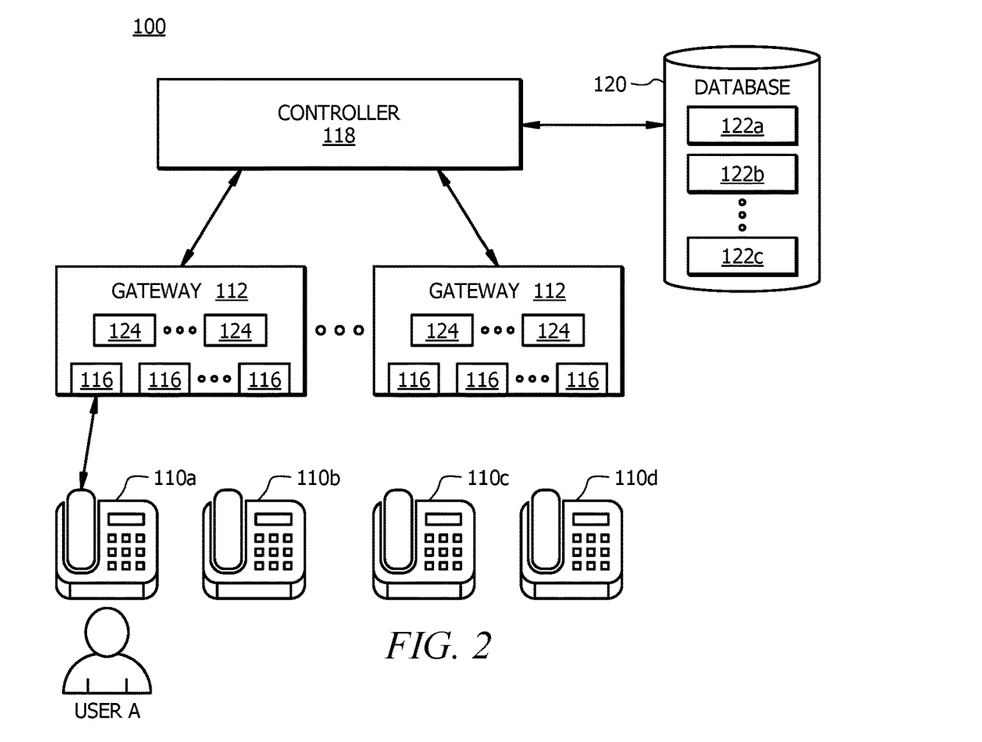
FIGS. 2-4 illustrate an example method that may be performed by an SD-WAN controller.
Figure 3:
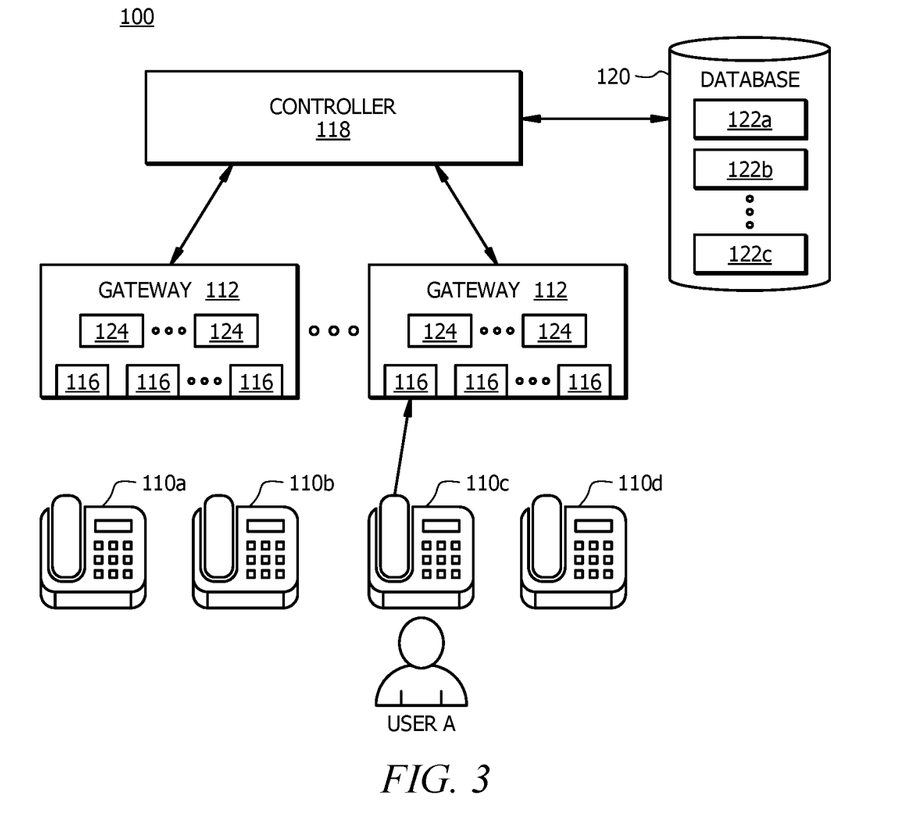
Figure 4:
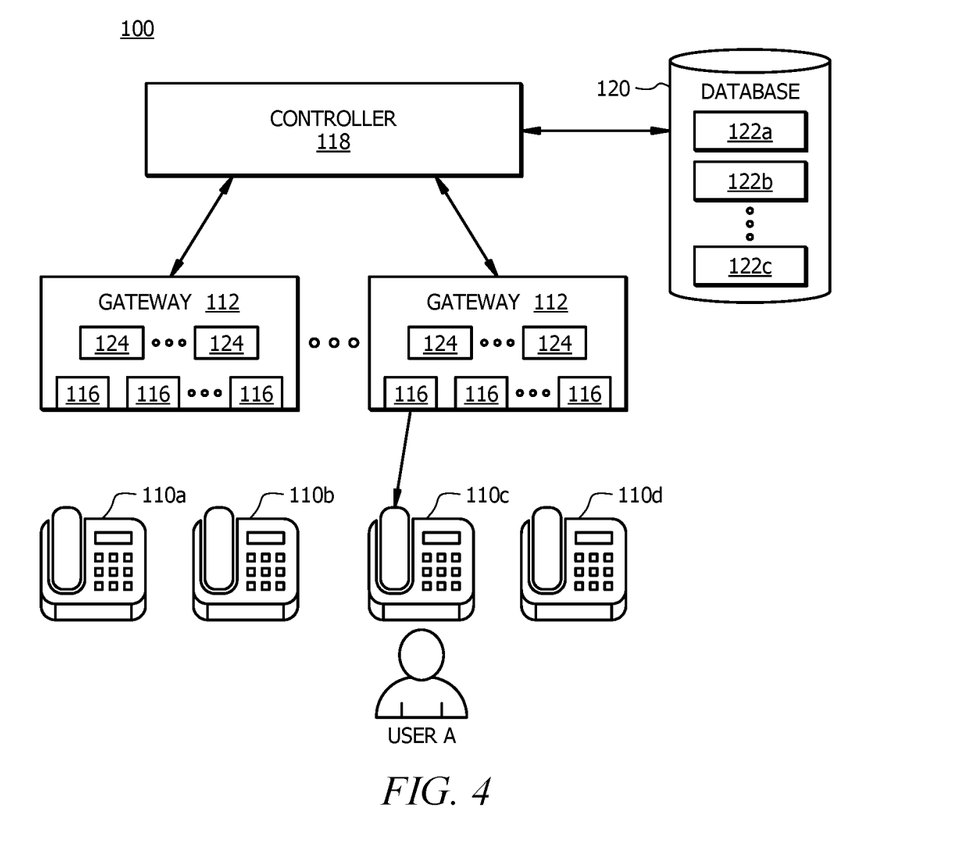

FIGS. 2-4 illustrate an example method that may be performed by an SD-WAN controller. User profiles 122 may be pre-provisioned on SD-WAN controller 118 (e.g., using an Analog Port Feature Template/Device Template). The profiles may each be associated with user credentials. For example, each user profile 122 may comprise information identifying the user (e.g., the users name, phone number, etc.) and/or information for customizing an analog telephone 110 (e.g., default volume level, caller ID, etc.).

As illustrated in FIG. 2, SD-WAN controller 118 is in communication with database 120 storing pre-provisioned user profiles 122 for one or more users. SD-WAN controller 118 is also in communication with several analog telephones 110 (or a representation of the analog telephones on voice gateway 112) as endpoint devices.

A first user, User A, has registered a first telephone, telephone 110a, as their main telephone. The telephone may be configured based on the user's profile. For example, user configuration 124 may be associated with an analog telephone interface 116 communicably coupled to telephone 110a. User configuration 124 may be configured according to information associated with user profile 122a for User A.

SD-WAN controller 118 may receive a request from a user to provision analog telephone 110a based on the user's profile, for example by downloading the user's profile 122a to the analog telephone (or voice gateway 112 controlling analog telephone 110). The request may indicate the analog telephone to be provisioned, the user profile to be used, and user credentials authenticating the use of the user's profile.

As an example, the user may key in the credentials via analog telephone 110. The analog telephone may be determined automatically based on port or routing information or other identifiers associated with the analog telephone (e.g., port identifier of port 116 of voice gateway 112 connected to analog telephone 110). As another example, the user may request provisioning out-of-band through an application interface on a separate device (e.g., a web browser). The user may indicate the analog telephone to be provisioned through use of a directory that correlates a user's workspace with an analog phone.

In FIG. 3, User A has moved to a second analog telephone, analog telephone 110c. Analog telephone 110c may be another analog telephone near the first analog telephone 110a (e.g., at a desk down the hall). The second analog telephone 110c may be at another location of the same workplace (e.g., at a branch office). The second analog telephone 110c may be at a third-party that shares user profiles with the user's employer (e.g., a preferred hotel or shared workspace).

Because the first analog telephone 110a has been provisioned with User A's information, the network will continue to route phone calls for the user (e.g., phone calls to the user's phone number) to the first analog telephone 110a. Wishing not to miss an important call, for example, User A may decide to configure the second analog telephone 110c with their information.

User A may enter a username and password into analog telephone 110c. For example, User A may enter digits for a code that activates an interactive voice response (IVR) system, Voice gateway 112 may detect the digits and facilitate interaction with the IVR system. Voice gateway 112 may send the entered information to SD-WAN controller 118.

SD-WAN controller 118 may authenticate the username and password. In some embodiments, SD-WAN controller 118 automatically identifies that phone from which User A has entered the information.

SD-WAN controller 118 accesses the appropriate user profile 122 from the user profile database 120. SD-WAN controller 118 provisions the user's profile on the analog telephone 110c (e.g., the user's profile is pushed to the voice gateway controlling the analog telephone). This configures the analog telephone and makes the analog phone unique for the user in the network.

For example, outgoing calls may have the user's name and regular phone number on the caller ID. Incoming calls to the user's regular number may be redirected to the provisioned phone. The user profile can be pushed to the phone without requiring a traditional registration with a call register.

In FIG. 4, after validating User A's credentials, SD-WAN controller 118 has retrieved User A's profile 122a from the user profile database. User A's profile includes identifying information (e.g., User A's name), routing information (User A's phone number), and personalization information (e.g., a preferred ringtone). SD-WAN controller 118 transmits User A's profile 122a to the voice gateway 112 controlling the second analog telephone 110c.

Voice gateway 112 may configure analog interface 116 communicably coupled to analog telephone 110c by updating user configuration 124 associated with analog interface 116 based on the received user profile 122a.

In some embodiments, SD-WAN controller 118 may send a request to voice gateway 112 to unassociate analog telephone 110*a* with User A. User A's calls will now be routed to analog telephone 110*c*.

Figure 5:
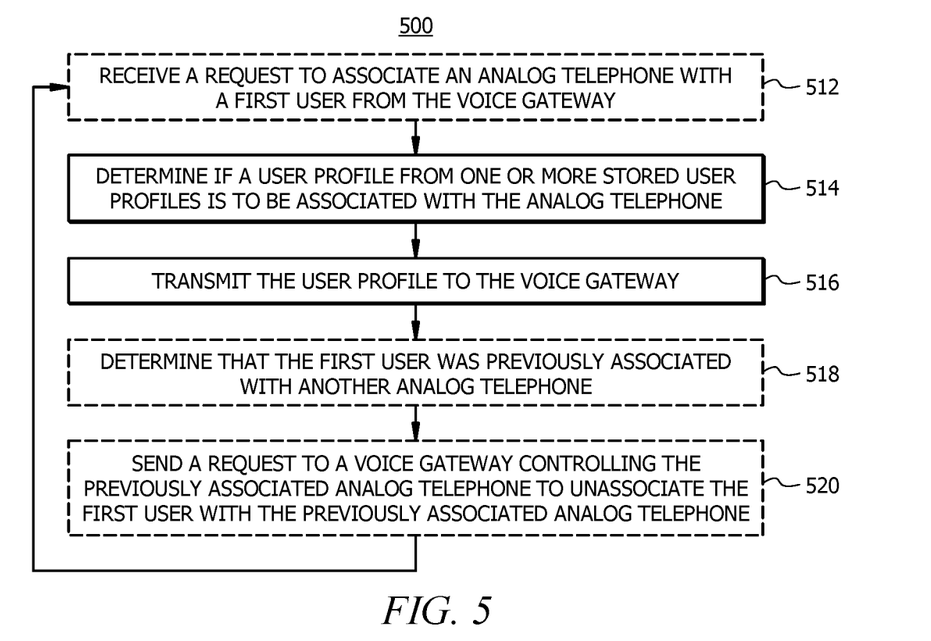
FIG. 5 is a flow diagram illustrating an example method in a SD-WAN controller.

FIG. 5 is a flow diagram illustrating an example method in a SD-WAN controller. The SD-WAN controller is communicably coupled to a voice gateway. The steps of method 500 in FIG. 5 may be performed by SD-WAN controller 118 of SD-WAN network 100 illustrated in FIGS. 1-4.

The method may begin at step 512, where the SD-WAN controller receives a request to associate an analog telephone with a first user from the voice gateway. For example, SD-WAN controller 118 may receive a request from voice gateway 116 to associate a first user with analog telephone 110*c*. In other embodiments, the request may be based on a schedule update, where a user's work schedule automatically triggers a request to associate the user with a particular device.

At step 514, the SD-WAN controller determines a user profile from one or more stored user profiles is to be associated with the analog telephone. For example, a request from step 512 may include user information, such as an identifier and/or authentication information. SD-WAN controller 118 may obtain a user profile for the user from its database.

At step 516, the SD-WAN controller transmits the user profile to the voice gateway. For example, SD-WAN controller 118 may transmit user profile 122*a* to voice gateway 112 according to any of the examples or embodiments described above.

At step 518, the SD-WAN controller may determine that the first user was previously associated with another analog telephone. For example, SD-WAN controller 118 may determine that the first user was previously associated with analog telephone 110*a*.

At step 520, the SD-Wan controller may send a request to a voice gateway controlling the previously associated analog telephone to unassociate the first user with the previously associated analog telephone. For example, SD-WAN controller 118 may send a request to a voice gateway 116 to unassociated the first user from analog telephone 110*a*.

The method may be repeated as necessary. For example, the first user may stop using analog telephone 110*c* and SD-WAN controller 118 may remove the configuration for the first user or return analog telephone 110*c* to a default configuration. SD-WAN controller 118 may receive a request to associate another user with analog telephone 110*c* and may repeat some or all of steps 512-520 for the new user.

Modifications, additions, or omissions may be made to method 500 depicted in FIG. 5. Method 500 may include more, fewer, or other steps. Additionally, steps may be performed in parallel or in any suitable order.

FIG. 6 is a block diagram illustrating an example network node, according to particular embodiments. A network node may comprise a SD-WAN controller and/or a gateway (such as SD-WAN controller 118 and/or voice gateway 112 described with respect to FIGS. 1-4).

In particular embodiments, one or more network nodes 600 perform one or more steps of one or more methods described or illustrated herein, such as the methods described with respect to FIGS. 2-5. In particular embodiments, one or more network nodes 600 provide functionality described or illustrated herein, such as the functionality described with respect to FIGS. 1-5. In particular embodiments, software running on one or more network nodes 600 performs one or more steps of one or more methods described or illustrated herein or provides functionality described or illustrated herein. Particular embodiments include one or more portions of one or more network nodes 600. Herein, reference to a network node may encompass a computing device, and vice versa, where appropriate. Moreover, reference to a network node may encompass one or more network nodes, where appropriate.

Particular embodiments may include any suitable number of network nodes 600. Network node 600 may take any suitable physical form. As example and not by way of limitation, network node 600 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, network node 600 may include one or more network nodes 600; be unitary or distributed; span multiple locations; span multiple machines; span multiple data centers; or reside in a cloud, which may include one or more cloud components in one or more networks.

Where appropriate, one or more network nodes 600 may perform without substantial spatial or temporal limitation one or more steps of one or more methods described or illustrated herein. As an example and not by way of limitation, one or more network nodes 600 may perform in real time or in batch mode one or more steps of one or more methods described or illustrated herein. One or more network nodes 600 may perform at different times or at different locations one or more steps of one or more methods described or illustrated herein, where appropriate.

In particular embodiments, network node 600 includes a processor 602, memory 604, storage 606, an input/output (I/O) interface 608, a communication interface 610, and a bus 612. Although this disclosure describes and illustrates a particular network node having a particular number of particular components in a particular arrangement, particular embodiments may include any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Processor 602 may include any suitable number of any suitable internal caches, where appropriate.

As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data.

The data caches may speed up read or write operations by processor 602. The TLBs may speed up virtual-address translation for processor 602.

In particular embodiments, processor 602 may include one or more internal registers for data, instructions, or addresses. Processor 602 may include any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, particular embodiments may include any suitable processor.

In particular embodiments, memory 604 includes main memory for storing instructions for processor 602 to execute or data for processor 602 to operate on. As an example and not by way of limitation, network node 600 may load instructions from storage 606 or another source (such as, for example, another network node 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 604 may include one or more memories 604, where appropriate. Although this disclosure describes and illustrates particular memory, particular embodiments may include any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to network node 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 606 may take any suitable physical form.

Storage 606 may include one or more storage control units facilitating communication between processor 602 and storage 606, where appropriate. Where appropriate, storage 606 may include one or more storages 606. Although this disclosure describes and illustrates particular storage, particular embodiments may include any suitable storage.

In particular embodiments, I/O interface 608 includes hardware, software, or both, providing one or more interfaces for communication between network node 600 and one or more I/O devices. Network node 600 may include one or more of these I/O devices, where appropriate. One or more of these I/O devices may enable communication between a person and network node 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, particular embodiments may include any suitable I/O interface. In particular embodiments, I/O interface 608 may include an interface to a remote network management system.

In particular embodiments, communication interface 610 includes hardware, software, or both providing one or more interfaces for communication (such as, for example, packet-based communication) between network node 600 and one or more other network nodes 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 610 for it. As an example and not by way of limitation, network node 600 may communicate with an ad hoc network, a personal area network (PAN), a LAN, WAN, MAN, or one or more portions of the Internet or a combination of two or more of these. One or more portions of one or more of these networks may be wired or wireless. As an example, network node 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Network node 600 may include any suitable communication interface 610 for any of these networks, where appropriate. Communication interface 610 may include one or more communication interfaces 610, where appropriate. Although this disclosure describes and illustrates a particular communication interface, particular embodiments may include any suitable communication interface.

In particular embodiments, bus 612 includes hardware, software, or both coupling components of network node 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs)(such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A system comprising:
    an analog telephone, a voice gateway, and a software defined wide area network (SD-WAN) controller;
    the analog telephone communicably coupled to the voice gateway and the voice gateway communicably coupled to the SD-WAN controller;
    the SD-WAN controller comprising:
        a memory comprising instructions and one or more user profiles;
        a hardware processor;
    the voice gateway comprising:
        one or more analog telephone interfaces;
        a memory comprising instructions and one or more user configurations, wherein each user configuration of the one or more user configurations is associated with one of the one or more analog telephone interfaces;
        a hardware processor;
    wherein the SD-WAN controller, when executing the instructions at the hardware processor, is configured to:
        retrieve a user profile;
        transmit the user profile to the voice gateway after validating a user's credentials, wherein the user profile comprises user preference information for customizing a device of a user, a preferred ring tone, a default volume, a user's name, and a phone number for caller ID;
        determine that the user was previously associated with another analog telephone; and
        send a request to an additional voice gateway controlling the previously associated analog telephone to unassociate the user with the previously associated analog telephone;
    wherein the voice gateway, when executing the instructions at the hardware processor, is configured to:
        receive the user profile from the SD-WAN controller; and
        update a user configuration associated with the analog telephone, wherein updating the user configuration customizes the analog telephone based on the user preference information.

2. The system of claim 1, wherein:
    the voice gateway, when executing the instructions at the hardware processor, is further configured to:
        receive a request to associate the analog telephone with a user;
        transmit the request to associate the analog telephone with the user to the SD-WAN controller;
    and wherein the SD-WAN controller, when executing the instructions at the hardware processor, is further configured to:
        receive the request to associate the analog telephone with the user from the voice gateway;
        obtain the user profile for the user in the received request; and
        wherein the user profile transmitted to the voice gateway comprises the obtained user profile.

3. The system of claim 2, wherein the voice gateway is configured to receive a request to associate the analog telephone with a user by receiving a request from the analog telephone.

4. The system of claim 3, wherein the request comprises a keypress combination or a voice command.

5. The system of claim 2, wherein the voice gateway is configured to receive a request to associate the analog telephone with a user by receiving an out-of-band request.

6. The system of claim 1, wherein the SD-WAN controller, when executing the instructions at the hardware processor, is further configured to:
    obtain a schedule of users for the one or more analog telephones; and
    wherein the user profile transmitted to the voice gateway is based on the obtained schedule.

7. The system of claim 1, wherein the voice gateway and the additional voice gateway are not separate gateways.

8. A method performed by a software defined wide area network (SD-WAN) controller communicably coupled to a voice gateway, the method comprising:
   determining a user profile from one or more stored user profiles is to be associated with an analog telephone, wherein the user profile contains user preference information for customizing a device of a user, a preferred ring tone, a default volume, a user's name, and a phone number for caller ID;
   transmitting the user profile to the voice gateway after validating a user's credentials, wherein the user preference information is used to customize an analog telephone of the user;
   determining that the user was previously associated with another analog telephone; and
   sending a request to an additional voice gateway controlling the previously associated analog telephone to unassociate the user with the previously associated analog telephone.

9. The method of claim 8, further comprising:
   receiving a request to associate the analog telephone with a first user from the voice gateway;
   wherein determining the user profile from the one or more stored user profiles comprises determining a stored user profile associated with the first user received from the voice gateway; and
   wherein the user profile transmitted to the voice gateway comprises the user profile associated with the first user.

10. The method of claim 9, wherein the first user is associated with more than one user profile and determining the user profile comprises determining one of the user profiles that is associated with an analog telephone.

11. The method of claim 9, further comprising:
   receiving a request to associate the analog telephone with a second user from the voice gateway;
   wherein determining the user profile from the one or more stored user profiles comprises determining a stored user profile associated with the second user received from the voice gateway; and
   wherein the user profile transmitted to the voice gateway comprises the user profile associated with the second user.

12. The method of claim 9, wherein the request to associate the analog telephone with a first user from the voice gateway comprises a user identifier and user authentication.

13. The method of claim 8, further comprising:
   obtaining a schedule of users for one or more analog telephones; and
   wherein determining the user profile from one or more stored user profiles comprises determining the user profile based on the obtained schedule.

14. The method of claim 8, wherein the voice gateway and the additional voice gateway are not separate gateways.

15. A software defined wide area network (SD-WAN) controller, the SD-WAN controller comprising:
   a memory comprising instructions and one or more user profiles;
   a hardware processor;
   wherein the SD-WAN controller, when executing the instructions at the hardware processor, is configured to:
   determine a user profile from one or more stored user profiles is to be associated with an analog telephone, wherein the user profile contains user preference information for customizing a device of a user, a preferred ring tone, a default volume, a user's name, and a phone number for caller ID;
   transmit the user profile to a voice gateway after validating a user's credentials, wherein the user preference information is used to customize an analog telephone of the user;
   determine that the user was previously associated with another analog telephone; and
   send a request to an additional voice gateway controlling the previously associated analog telephone to unassociate the user with the previously associated analog telephone.

16. The SD-WAN controller of claim 15, further configured to:
   receive a request to associate the analog telephone with a first user from the voice gateway;
   wherein the SD-WAN controller is configured to determine the user profile from the one or more stored user profiles by determining a stored user profile associated with the first user received from the voice gateway; and
   wherein the user profile transmitted to the voice gateway comprises the user profile associated with the first user.

17. The SD-WAN controller of claim 16, further configured to:
   receive a request to associate the analog telephone with a second user from the voice gateway;
   wherein the SD-WAN controller is configured to determine the user profile from the one or more stored user profiles by determining a stored user profile associated with the second user received from the voice gateway; and
   wherein the user profile transmitted to the voice gateway comprises the user profile associated with the second user.

18. The SD-WAN controller of claim 16, wherein the request to associate the analog telephone with a first user from the voice gateway comprises a user identifier and user authentication.

19. The SD-WAN controller of claim 15, further configured to:
   obtain a schedule of users for one or more analog telephones; and
   wherein the SD-WAN controller is configured to determine the user profile from one or more stored user profiles by determining the user profile based on the obtained schedule.

20. The SD-WAN controller of claim 15, wherein the voice gateway and the additional voice gateway are not separate gateways.

* * * * *